UNITED STATES PATENT OFFICE.

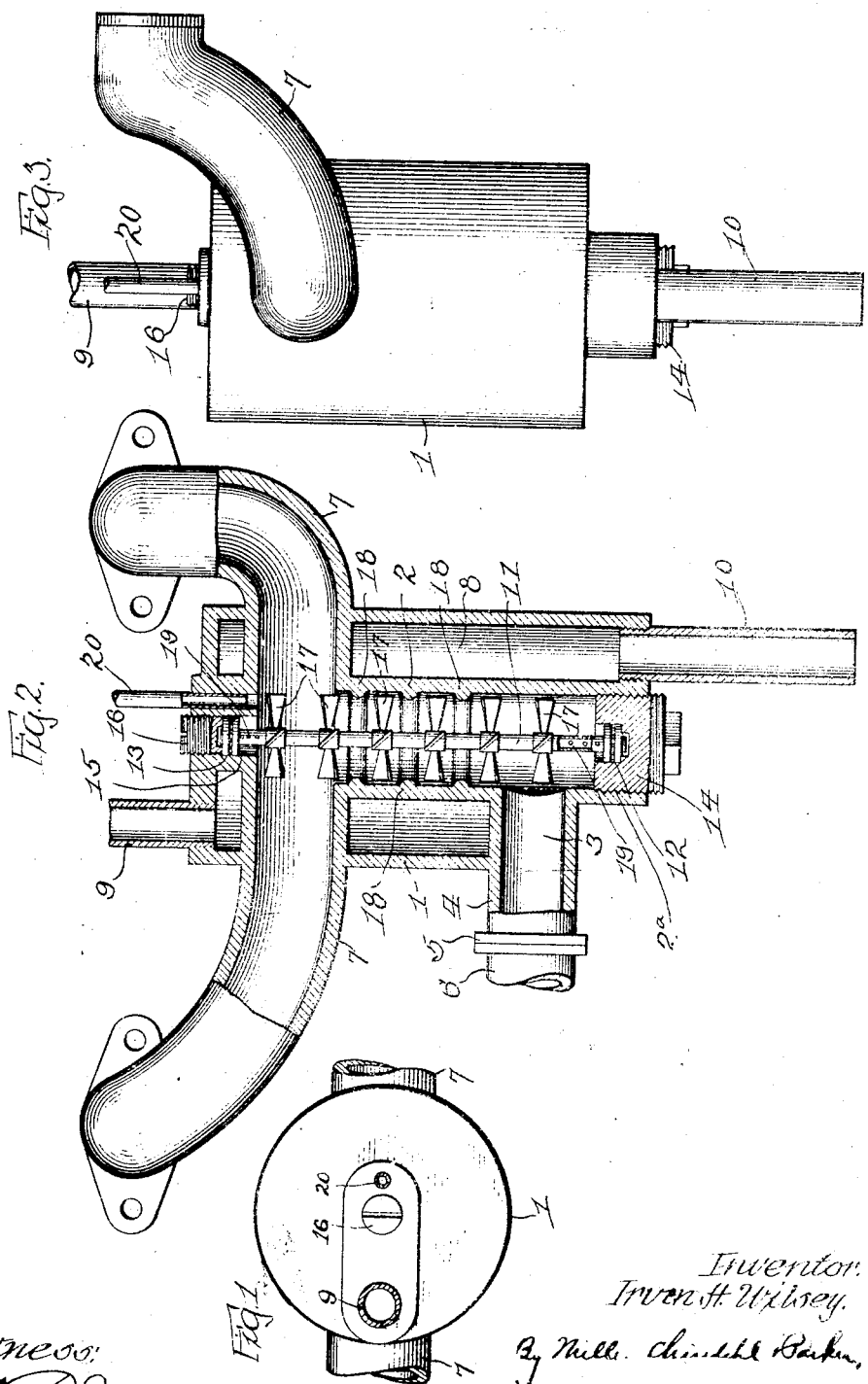

IRVEN H. WILSEY, OF CHICAGO, ILLINOIS.

ATOMIZER AND VAPORIZER.

1,386,297.  Specification of Letters Patent.  Patented Aug. 2, 1921.

Application filed February 21, 1919. Serial No. 278,374.

*To all whom it may concern:*

Be it known that I, IRVEN H. WILSEY, a citizen of the United States, residing at Chicago, in the county of Cook and State of Illinois, have invented a certain new, useful and Improved Atomizer and Vaporizer, of which the following is a specification.

This invention relates to means for converting kerosene or the like into a suitable form for effective use in an internal combustion engine. The means employed to attain this object comprises a construction whereby a current of air carrying particles of kerosene is subjected to heat and mechanical action during its passage from the carbureter or mixing valve to the cylinders.

In the accompanying drawings Figure 1 is a fragmental top plan view of a construction embodying the features of my invention. Fig. 2 is a vertical central sectional view. Fig. 3 is an elevation of the apparatus.

The embodiment herein shown of my invention comprises an outer casing 1 containing an inner casing 2 of substantially cylindrical form. The lower portion of the casing 2 communicates with a passage 3 which is prolonged into a tube 4 having a supporting flange 5 by means of which the apparatus may be connected to the discharge or outlet element 6 of a carbureter or mixing valve of any suitable form.

The upper portion of the casing 2 communicates with an inlet manifold 7 which extends through the casing 1. The manifold 7 is arranged to communicate with the engine cylinders in the usual, or any suitable manner.

The annular space between the casings 1 and 2 constitutes a heating jacket 8 which is arranged to communicate with the exhaust element of the engine in any suitable manner, as, for example, by means of a tube 9. The tube 9 preferably communicates with the upper end of the casing 1 adjacent to the inlet manifold 7. The lower end of the heating jacket 8 communicates with an outlet tube 10.

Rotatably mounted within the casing 2 is a shaft 11 extending axially of said casing, the ends of said shaft being supported in ball bearings 12 and 13. The ball bearing 12 is mounted in a plug 14 which is screwed into an opening 2ª, in the lower end of the casing 2. The ball bearing 13 is mounted in an opening 15 in the upper end of the casing 1, said opening being axially alined with the opening 2ª. A screw plug 16 mounted in the upper end of the opening 15 provides means for holding the shaft 11 and bearings 12 and 13 in place.

Fixed to the shaft 11 is a suitable number of fans or fan blades 17. Between certain of the fans 17, baffles 18 are formed upon the inner surface of the casing 2, each of such baffles consisting of an annular bead or rib projecting into the space between the fans.

The shaft 11 is preferably made tubular and has openings 19 in its upper and lower end portions. Any condensate that may collect at the bottom of the casing 2 will rise through the shaft 11 and thus serve to lubricate the upper ball bearing 13.

If desired, means may be provided for priming the device. Herein is shown a tube 20 communicating with the inlet manifold 7 at a point relatively close to the shaft 11, which tube 20 may extend to a point convenient to the operator's hand and may be provided with an ordinary priming cup (not shown). The tube 20 also may serve as an auxiliary air inlet. The fuel flowing in through the tube 20, will fall on the fan blades and splash from one set of blades to the next, covering a relatively large surface with a thin coating of liquid. As soon as the engine is turned over, the rush of air will rotate the fans and part of this liquid will be thrown off by centrifugal force, coating the walls of the casing 2.

In operation, the vacuum produced by the operation of the engine pistons causes a flow of air through the carbureter, the passage 3, the casing 2, and the inlet manifold 7. The rush of the kerosene-laden air through the casing 2 causes the fans 17 to revolve rapidly. In their rotation the fans serve to agitate the air current and thus atomize or break up the particles of kerosene passing through the casing 2. The baffles 18 also serve to agitate the current and prevent liquid particles from passing out between the peripheries of the fans and the interior walls of the casing 2.

The casing 2, the adjacent portion of the inlet manifold 7, the shaft 11, and the fans 17 are heated by the exhaust flowing through the casing 1. By means of the combined action of the heating and the mechanical effect of the fans 17 and baffles 18, the particles of kerosene carried into the casing 2 are thoroughly atomized and mixed with the air to form a mixture which may be effectively burned in the engine cylinders.

The entire rotor consisting of the shaft, fans and bearings may be removed as a unit through the opening 2ª.

I claim as my invention:

1. The combination with a tubular mixture passage, of a rotary mixing device in said passage having an axial shaft, and bearing supports for the ends of the shaft in opposite ends of the passage, one of said supports being of greater diameter than said device and removable to permit the bodily removal of said device through the end of the passage.

2. The combination of an upright mixture passage, diverging horizontal passages communicating therewith, a casing enveloping said upright passage and a portion of each of said horizontal passages, said casing having an opening in its top wall axially alined with said upright passage, a rotary mixing device in said upright passage, and a bearing for said device, in said opening.

In testimony whereof, I have hereunto set my hand.

IRVEN H. WILSEY.